United States Patent
Yoshitomi et al.

(10) Patent No.: US 10,406,977 B2
(45) Date of Patent: Sep. 10, 2019

(54) VEHICLE DRIVING ASSISTANCE APPARATUS AND VEHICLE DRIVING ASSISTANCE METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Naoto Yoshitomi, Kariya (JP); Jian Hu, Kariya (JP); Shota Satomura, Kariya (JP); Yusuke Fujimaki, Nisshin (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/166,833

(22) Filed: May 27, 2016

(65) Prior Publication Data

US 2016/0347318 A1 Dec. 1, 2016

(30) Foreign Application Priority Data

May 29, 2015 (JP) .................................. 2015-110564

(51) Int. Cl.
| | | |
|---|---|---|
| *B60W 30/18* | (2012.01) | |
| *B60Q 9/00* | (2006.01) | |
| *B60W 50/14* | (2012.01) | |

(52) U.S. Cl.
CPC ......... *B60Q 9/00* (2013.01); *B60W 30/18163* (2013.01); *B60W 50/14* (2013.01);
(Continued)

(58) Field of Classification Search
CPC ....... B60W 30/18009; B60W 2550/20; B60W 2550/30; B60Q 9/00
See application file for complete search history.

(56) References Cited

U.S. PATENT DOCUMENTS

| 2007/0177014 A1 | 8/2007 | Frenzel et al. | |
|---|---|---|---|
| 2009/0102629 A1* | 4/2009 | Kaller ................... | B60Q 9/008 340/435 |

(Continued)

FOREIGN PATENT DOCUMENTS

| JP | 2000-090393 | 3/2000 |
|---|---|---|
| JP | 2009-137385 | 6/2009 |
| JP | 2014-046748 | 3/2014 |

*Primary Examiner* — Jerrah Edwards
*Assistant Examiner* — Mathew Franklin Gordon
(74) *Attorney, Agent, or Firm* — Knobbe, Martens, Olson & Bear, LLP

(57) ABSTRACT

In a vehicle driving assistance apparatus, an initial action determiner determines the presence or absence of an initial action taken to start laterally moving, and a lateral movement determiner determines whether or not the own vehicle has laterally moved from a rearward position to a lateral position relative to a preceding vehicle. If the own vehicle has laterally moved after the initial action, based on at least one of a lateral distance between the own vehicle and the preceding vehicle and a relative speed of the own vehicle with respect to the preceding vehicle, a passing driving state determiner determines whether or not the own vehicle is in a passing driving state enabling the own vehicle to pass the preceding vehicle. If it is determined that the own vehicle is in the passing driving state, the own vehicle is likely to pass the preceding vehicle.

9 Claims, 3 Drawing Sheets

(52) U.S. Cl.
CPC . *B60W 2050/143* (2013.01); *B60W 2050/146* (2013.01); *B60W 2520/10* (2013.01); *B60W 2540/18* (2013.01); *B60W 2540/20* (2013.01); *B60W 2550/10* (2013.01); *B60W 2550/30* (2013.01)

(56) References Cited

U.S. PATENT DOCUMENTS

| | | |
|---|---|---|
| 2010/0315217 A1 | 12/2010 | Miura et al. |
| 2011/0313665 A1* | 12/2011 | Lueke .................. G01S 13/931 701/301 |
| 2012/0245756 A1* | 9/2012 | Cooprider ........... B60W 30/146 701/1 |
| 2012/0296539 A1* | 11/2012 | Cooprider ............. B60W 10/06 701/70 |
| 2014/0343836 A1* | 11/2014 | Maise .................... G08G 1/162 701/301 |
| 2015/0213319 A1 | 7/2015 | Frenzel et al. |
| 2015/0215550 A1 | 7/2015 | Frenzel et al. |
| 2016/0039411 A1* | 2/2016 | Park ........................ G01S 13/87 701/70 |

\* cited by examiner

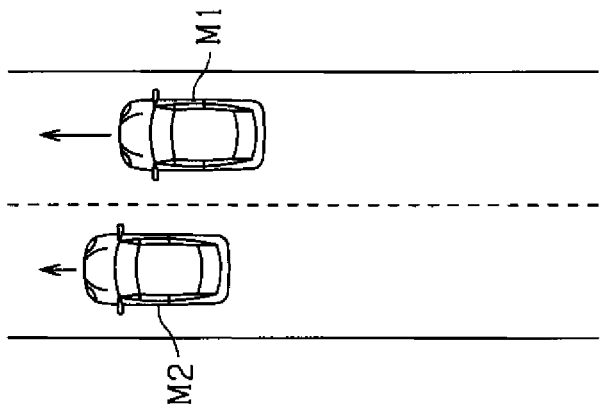
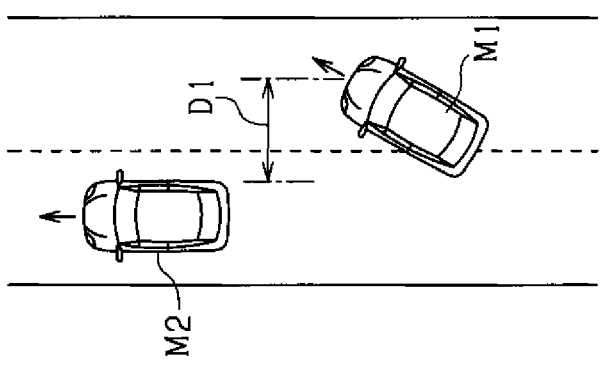
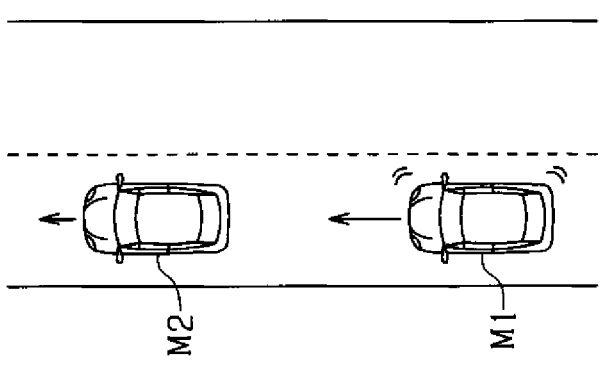

VEHICLE DRIVING ASSISTANCE APPARATUS AND VEHICLE DRIVING ASSISTANCE METHOD

CROSS-REFERENCE TO RELATED APPLICATION

This application is based on and claims the benefit of priority from earlier Japanese Patent Application No. 2015-110564 filed May 29, 2015, the descriptions of which are incorporated herein by reference.

BACKGROUND (Technical Field)

The present invention relates to a vehicle driving assistance apparatus and a vehicle driving assistance method.

(Related Art)

Conventionally, various vehicle driving assistance techniques have been proposed for assisting a driver in driving his or her own vehicle. For example, a known technique as disclosed in Japanese Patent Application Laid-Open Publication No. 2010-287162 is configured to detect a passing behavior of the own vehicle to pass a preceding vehicle, and based on a positional relationship between lanes of the own vehicle and the preceding vehicle during the passing behavior, determine whether or not the passing behavior is unsafe.

An event may occur where the own vehicle attempts to pass the preceding vehicle in a no-passing zone. To prevent occurrence of such an event, it is desirable to restrict passing in the no passing zone. For example, the technique as disclosed in Japanese Patent Application Laid-Open Publication No. 2010-287162, however, does not restrict passing, but only determines whether or not the passing behavior of the own vehicle is unsafe after completion of passing.

In consideration of the foregoing, exemplary embodiments of the present invention are directed to providing vehicle driving assistance techniques for accurately determining whether or not the own vehicle is passing the preceding vehicle traveling ahead of the own vehicle, thereby providing proper driving assistance.

SUMMARY

In accordance with an exemplary embodiment of the present invention, there is provided a vehicle driving assistance apparatus. In the apparatus, an initial action determiner is configured to, in the presence of a preceding vehicle traveling ahead of an own vehicle carrying the apparatus, determine the presence or absence of an initial action taken to start laterally moving from a rearward position to a lateral position relative to the preceding vehicle such that the own vehicle can accelerate from the lateral position to pass the preceding vehicle. A lateral movement determiner is configured to determine whether or not the own vehicle has laterally moved from the rearward position to the lateral position relative to the preceding vehicle. A passing driving state determiner is configured to, if the own vehicle has laterally moved from the rearward position to the lateral position relative to the preceding vehicle after the initial action has been taken, based on at least one of a lateral distance between the own vehicle and the preceding vehicle and a relative speed of the own vehicle with respect to the preceding vehicle, determine whether or not the own vehicle is in a passing driving state enabling the own vehicle to pass the preceding vehicle. A passing driving determiner is configured to, if it is determined by the passing driving state determiner that the own vehicle is in the passing driving state, determine that the own vehicle is likely to pass the preceding vehicle.

With the above configuration, it is determined whether or not the initial action has been taken to start laterally moving, and then it is determined whether or not the own vehicle has laterally moved from a rearward position to a lateral position relative to the preceding vehicle. Further, based on at least one of a lateral distance between the own vehicle and the preceding vehicle and a relative speed of the own vehicle with respect to the preceding vehicle, it is determined whether or not the own vehicle is in the passing driving state enabling the own vehicle to pass the preceding vehicle. This allows the presence or absence of passing driving of the own vehicle to be properly determined, and thus allows whether or not the own vehicle is likely to pass the preceding vehicle to be properly determined, thereby providing proper driving assistance.

BRIEF DESCRIPTION OF THE DRAWINGS

FIGS. 3A to 3C are schematics of the passing determination processing performed when an own vehicle is traveling in a no-passing zone.

DESCRIPTION OF SPECIFIC EMBODIMENTS

Hereinafter, embodiments of the invention will be described with reference to the accompanying drawings. A driving assistance system in accordance with one embodiment will now be described with reference to FIG. 1A. The driving assistance system 1 is mounted on a vehicle to perform a variety of driving assistance processing for assisting a vehicle's driver in driving the vehicle.

Figure 1A:
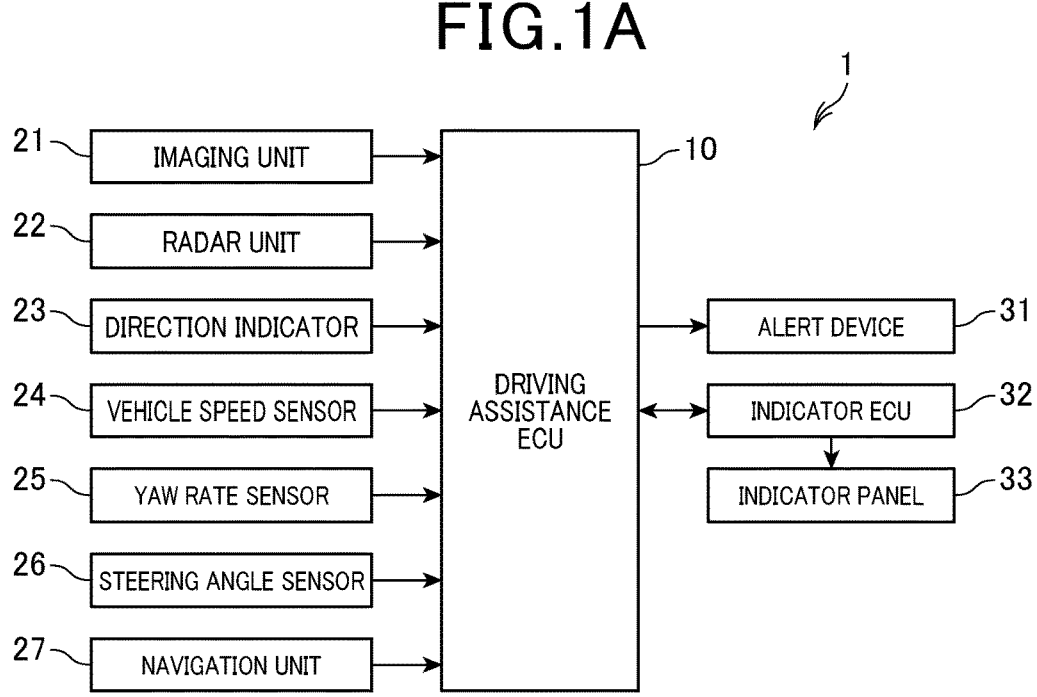
FIG. 1A is a block diagram of a vehicle driving assistance system in accordance with one embodiment of the present invention.

Referring to FIG. 1A, the driving assistance system 1 includes a driving assistance electronic control unit (ECU) 10 serving as a driving assistance apparatus. The driving assistance ECU 10 may be a microcomputer formed of a central processing unit (CPU), a read-only memory (ROM), a random-access memory (RAM), an input/output (I/O) interface, and other components.

Figure 1B:
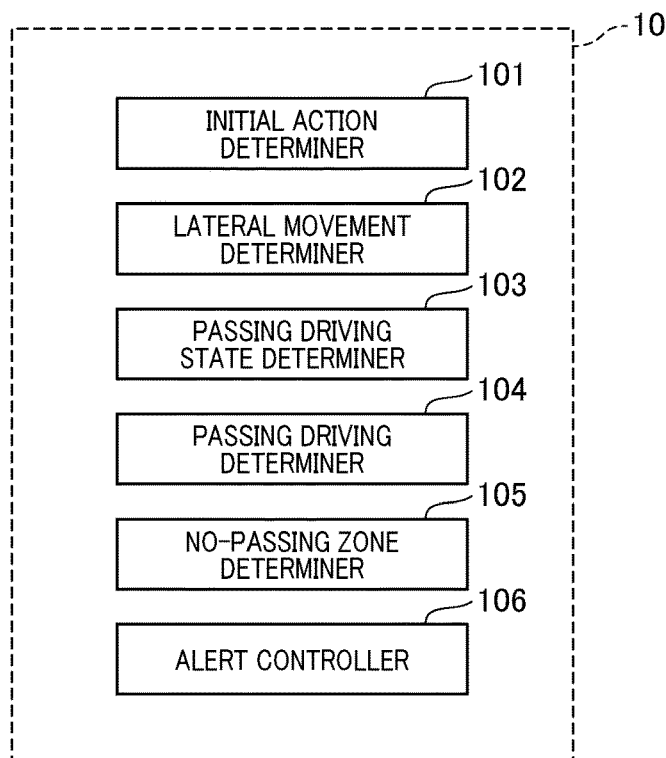
FIG. 1B is a functional block diagram of a driving assistance ECU.

As shown in FIG. 1B, the driving assistance ECU 10 includes, as functional blocks to perform passing determination processing (described later), an initial action determiner 101, a lateral movement determiner 102, a passing driving state determiner 103, a passing driving determiner 104, a no-passing zone determiner 105, and an alert controller 106. Functions of these blocks, which will be described later, may be implemented by the CPU of the driving assistance ECU 10 executing computer programs stored in the ROM.

The driving assistance system 1 includes an imaging unit 21, a radar unit 22, a direction indicator 23, a vehicle speed sensor 24, a yaw rate sensor 25, a steering angle sensor 26, and a navigation unit 27 that are operatively connected to the driving assistance ECU 10. Detection signals and a variety of information are fed to the driving assistance ECU 10.

The imaging unit 21 may include at least one of a charge-coupled device (CCD) camera, a CMOS image sensor, a near-infrared camera and the like. The imaging unit 21 captures an image of surroundings of the vehicle including a roadway in front of the vehicle to sequentially output image data of the captured image to the driving assistance ECU 10. The imaging unit 21 may be placed near the top end of a front windshield of the vehicle to capture an image of a front area that horizontally spans a pre-defined range of angles from an imaging axis. The imaging unit 21 may be a monocular camera or a stereoscopic camera.

The radar device 22 may include a millimeter-wave radar, a laser radar or the like, and is configured to transmit electromagnetic waves as transmit waves and receive their reflected waves to detect targets. The radar device 22 is placed at the front of the own vehicle to scan a front area that horizontally spans a pre-defined range of angles from a light axis with radar signals. The radar device 22 is configured to, based on an amount of time from emission of each electromagnetic wave to receipt of its reflected wave, produce ranging data and sequentially output the raging data to the driving assistance ECU 10. The ranging data includes information for each detected target that is indicative of a direction, a distance and a relative speed of the detected target.

The direction indicator 23 is configured to display a traveling direction of the own vehicle to the surroundings of the own vehicle. The direction indicator 23 includes an indicator stalk to be placed in a left-turn indicating position, a neutral position or a right-turn indicating position by the driver, and is configured to output an operation signal responsive to the position of the indicator stalk to the driving assistance ECU 10.

The vehicle-speed sensor 24 is provided along a rotary shaft for transferring dynamical power to vehicle wheels and is configured to output a detection signal responsive to a vehicle speed. The yaw rate sensor 25 may include a vibrator, such as a tuning fork or the like, and is configured to detect a yaw rate by detecting distortion of the vibrator based on a vehicle yaw moment. The steering angle sensor 26 is configured to detect a steering angle that is an angle of operation of a steering wheel. A running state (i.e., behavior) of the own vehicle can be detected based on outputs from these sensors 24-26.

An alert device 31 is operatively connected to the driving assistance ECU 10. The alert device 31 is configured to notify the driver that a potentially hazardous situation for the own vehicle has occurred or that a prohibited action has been taken. The alert device 31 may include a speaker placed in a passenger compartment of the own vehicle and is configured to provide warning via voice or the like in response to a control command from the driving assistance ECU 10. Alternatively, the alert device 31 may include a display panel, such as a display, in an instrument panel. Still alternatively, the alert device 31 may be configured to provide warning by providing from a steering wheel, an accelerator pedal, a brake pedal or the like to the driver a vibration or a reaction force to a driving maneuver.

The driving assistance system 1 includes an indicator ECU 32 for controlling display on an indicator panel 33 provided on an interior front side of the passenger compartment. The indicator ECU 32 is bidirectionally and communicatively connected to the driving assistance ECU 10. The indicator ECU 32 is configured to display on the indicator panel 33 information indicative of the vehicle speed, an engine revolution speed and the like of the own vehicle, and recognize traffic signs on a roadway to display the recognition results on the indicator panel 33 or on the display panel provided in the instrument panel. In the present embodiment, the indicator ECU 32 is configured to, based on the image data from the imaging unit 21, recognize via pattern matching the presence or absence of the traffic signs and types of the traffic signs. Alternatively, the driving assistance ECU 10 may be configured to recognize the traffic signs and output the recognition results to the indicator ECU 32.

The own vehicle may travel in a no-passing zone where passing a preceding vehicle is restricted. The own vehicle may attempt to pass the preceding vehicle despite traveling in such a no-passing zone. In the present embodiment, when the own vehicle is traveling in the no-passing zone, it is determined whether or not the own vehicle is passing the preceding vehicle. If it is determined that the own vehicle is passing the preceding vehicle, then the alert device 31 provides warning.

Figure 2:
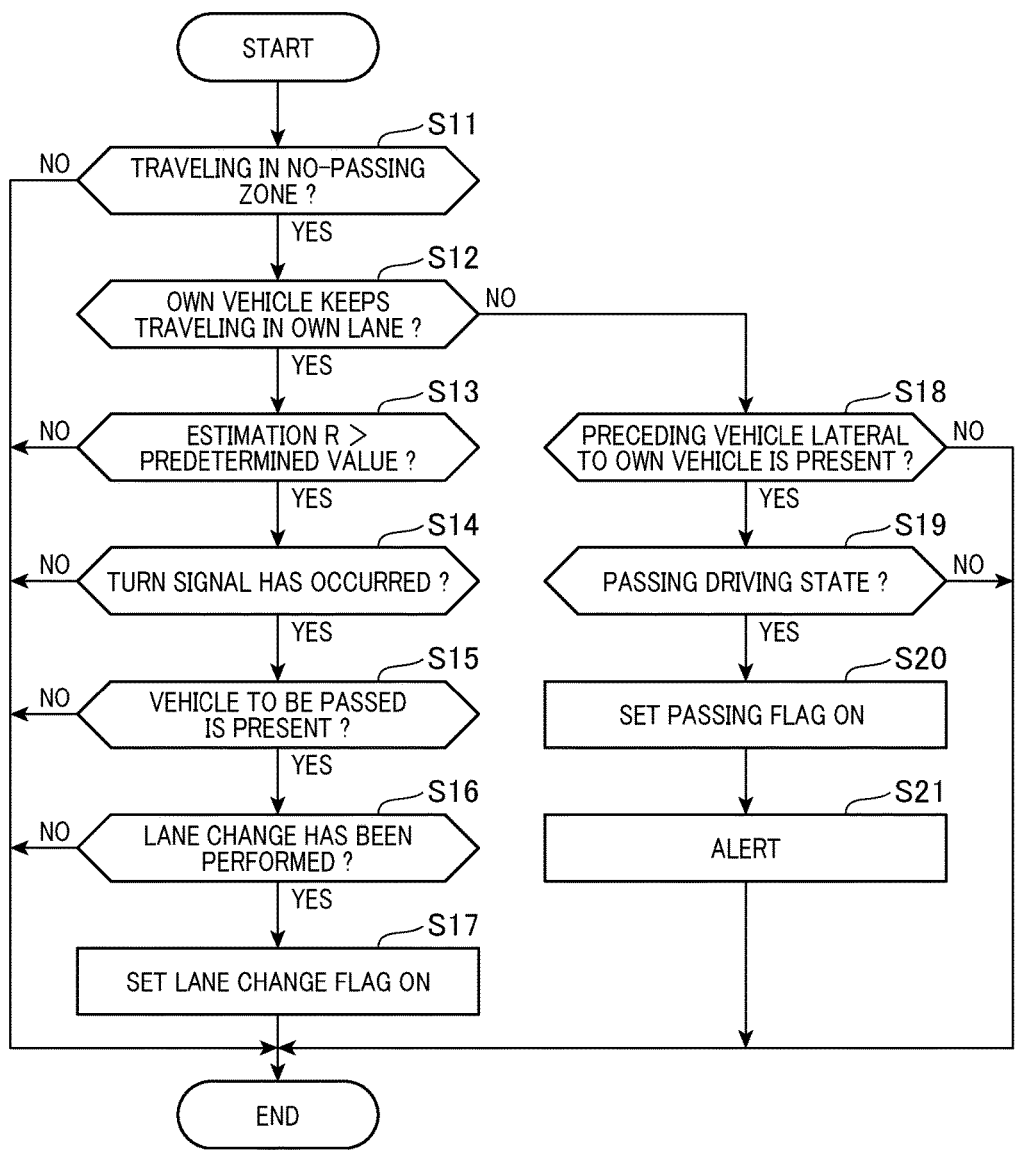
FIG. 2 is a flowchart of passing determination processing to be performed in the driving assistance ECU.

Passing determination processing to be performed in the driving assistance ECU 10 will now be described with reference to FIG. 2. The passing determination processing is iteratively performed every predetermined time interval.

In step S11, the driving assistance ECU 10 (as the no-passing zone determiner 105) determines whether or not the own vehicle is traveling in a no-passing zone. The determination as to whether or not the own vehicle is traveling in a no-passing zone is made based on the image data of a traffic sign captured by the imaging unit 21 that is indicative of the no-passing zone. Specifically, if a traffic sign indicative of the no-passing zone is recognized from the image data, then it is determined that the own vehicle is traveling in the no-passing zone. Alternatively, the determination as to whether or not the own vehicle is traveling in a no-passing zone may be made based on no-passing zone information included in navigation information. If in step S11 it is determined that the own vehicle is traveling in a no-passing zone, then the process flow proceeds to step S12.

In step S12, the driving assistance ECU 10 (as the initial action determiner 101) determines whether or not the own vehicle keeps traveling in an own lane without performing a lane change. If, during travel in the no-passing zone, the own vehicle keeps traveling in the own lane without performing the lane change from the own lane to an adjacent lane, the process flow proceeds to step S13.

In step S13, the driving assistance ECU 10 (as the initial action determiner 101) determines whether or not an estimation of a curve radius R of the lane in which the own vehicle is traveling (i.e., the own lane) is greater than a predetermined value. The estimation R of the own lane is calculated based on a yaw angle detected by the yaw rate sensor 25 and a vehicle speed detected by the vehicle-speed sensor 24. Alternatively, the estimation R of the own lane may be calculated based on a steering angle detected by the steering angle sensor 26 and the vehicle speed detected by the vehicle-speed sensor 24. If the estimation R of the own lane is greater than the predetermined value, then the process flow proceeds to step S14.

In step S14, the driving assistance ECU 10 (as the initial action determiner 101) determines whether or not a turn signal has occurred on an opposite hand side to the hand of traffic (i.e., indicating turning towards an oncoming lane side). The hand of traffic depends on individual countries. For example, Japan drives on the left hand side. Many countries in Europe drive on the right hand side. For example, in the case of the left-hand traffic, the driving assistance ECU 10 (as the initial action determiner 101) determines whether or not the right hand side turn signal has occurred. If the turn signal has occurred on the same hand side as the hand of traffic, it is less likely that the own vehicle is passing the preceding vehicle. If the turn signal has occurred on the opposite hand side to the hand of traffic, it is likely that the own vehicle is passing the preceding vehicle and then it is determined that the initial action has been taken to start laterally moving from a rearward position to a lateral position relative to the preceding vehicle, then the process flow proceeds to step S15.

In step S15, the driving assistance ECU 10 (as the lateral movement determiner 102) determines the presence or absence of a preceding vehicle to be passed. Criteria to determine that there is a preceding vehicle to be passed include, but are not limited to, a first condition that the speed of the own vehicle is equal to or greater than a predetermined speed (e.g., 30 km/h), a second condition that a distance between the preceding vehicle and the own vehicle in a traveling direction of the own vehicle is equal to or less than a predetermined distance (e.g., 70 m), a third condition that a lateral position of the preceding vehicle relative to the own vehicle is within a predetermined range (i.e., a distance between lane lines defining the own lane), and a fourth condition that a relative speed of the own vehicle with respect to the preceding vehicle is within a predetermined range. If the first to fourth conditions are met, it is determined that a preceding vehicle to be passed is present. If in step S15 it is determined that a preceding vehicle to be passed is present, then the process flow proceeds to step S16.

In step S16, the driving assistance ECU 10 (as the lateral movement determiner 102) determines whether or not a lane change has been performed by the own vehicle, that is, whether or not the own vehicle has laterally moved from a rearward position to a lateral position relative to the preceding vehicle such that the own vehicle can accelerate from the lateral position to pass the preceding vehicle. Criteria to determine that the lane change has been performed by the own vehicle include, but are not limited to, a fifth condition that an amount of lateral movement of the own vehicle for a predetermined time period after turning on of the turn signal is equal to or greater than a predetermined value (e.g., 1.5 m) required to perform the lane change and a sixth condition that a direction of the lateral movement coincides with a direction indicated by the turn signal. If the fifth and sixth conditions are met, it is determined that a lane change has been performed by the own vehicle. If in step S16 it is determined that a lane change has been performed, then the process flow proceeds to step S17.

In step S17, the driving assistance ECU 10 (as the lateral movement determiner 102) determines that the lane change has been performed by the own vehicle and sets a lane change flag ON to indicate that the lane change has been performed. Then, the process flow ends. Based on the lane change flag set ON, NO is determined in step S12 in the next cycle. In addition, if NO is determined in any one of steps S11, S13 to S16, then the process flow ends.

If in step S12 the driving assistance ECU 10 (as the initial action determiner 101) determines that the lane change has been performed, then the process flow proceeds to step S18, where the driving assistance ECU 10 (as the passing driving state determiner 103) determines whether or not the preceding vehicle to be passed is present as a vehicle lateral to the own vehicle. Criteria for determining that the preceding vehicle to be passed is present as a vehicle lateral to the own vehicle include, but are not limited to, a seventh condition that a lateral position of the preceding vehicle relative to the own vehicle is within a predetermined range. More specifically, the seventh condition is that a lateral distance from a reference position of the lateral center of the own vehicle to the preceding vehicle is greater than a lower limit of the range that allows the own vehicle to pass the preceding vehicle from the rearward and lateral position relative to the preceding vehicle and less than an upper limit of the range that ensures that the own vehicle is not too laterally far away from the preceding vehicle. The predetermined range is from 2 to 5 m. If in step S18 it is determined that there is the preceding vehicle lateral to the own vehicle within the predetermined range, the process flow proceeds to step S19.

In step S19, based a relative speed of the own vehicle with respect to the preceding vehicle, the passing driving state determiner 103 determines whether or not the own vehicle is in a passing driving state. More specifically, for example, if the speed of the own vehicle exceeds that of the preceding vehicle by a predetermined value or more, the driving assistance ECU 10 (as the passing driving state determiner 103) determines that the own vehicle is in the passing driving state. If in step S19 it is determined that the own vehicle is in the passing driving state, then the process flow proceeds to step S20.

In step S20, the driving assistance ECU 10 (as the passing driving determiner 104) determines that the own vehicle is in the passing driving state and sets a passing flag ON to indicate that the own vehicle is in the passing driving state. Subsequently, in step S21, the driving assistance ECU 10 (as the alert controller 106) alerts the driver via the alert device 31 to a dangerous situation that the own vehicle is passing the preceding vehicle in the no-passing zone. In addition to alerting the driver of the own vehicle, traveling of the own vehicle may be restricted.

FIGS. 3A-3C show an example of the passing determination processing to be performed when the own vehicle is traveling in the no-passing zone of a roadway. The roadway in this example is assumed to have a single lane in each direction. FIG. 3A shows occurrence of the turn signal of the own vehicle M1, FIG. 3B shows the lane change of the own vehicle M1, and FIG. 3C shows passing driving of the own vehicle M1.

As shown in FIG. 3A, there is a preceding vehicle M2 traveling ahead of the own vehicle M1 in the same lane. In such a situation, upon occurrence of an oncoming lane side turn signal, it is determined that the initial action has been taken to start laterally moving from a rearward position to a lateral position relative to the preceding vehicle.

As shown in FIG. 3B, after the lane change of the own vehicle M1, it is determined that the own vehicle has laterally moved from a rearward position to a lateral position relative to the preceding vehicle if the lateral distance D1 from the own vehicle M1 to the preceding vehicle M2 is within the predetermined range. Thus, it is determined that there is a preceding vehicle to be passed is present lateral to the own vehicle M1.

Thereafter, as shown in FIG. 3C, if the speed of the own vehicle M1 exceeds that of the preceding vehicle M2 by the predetermined value or more via acceleration or the like of the own vehicle M1, it is determined that the own vehicle M1 is in the passing driving state. In the passing driving state, the own vehicle is deemed to be traveling to pass the preceding vehicle. In such a situation, the driver will be alerted by the alert device 31 to cease passing driving.

The vehicle driving assistance apparatus of the present embodiment configured as above can provide the following advantages.

To pass a preceding vehicle, the own vehicle first performs a lane change or the like to laterally move from a rearward position to a lateral position relative to the preceding vehicle, and then accelerate to pass the preceding vehicle. More specifically, the driving assistance ECU 10 of the present embodiment determines whether or not the initial action has been taken to start laterally moving, and then determines whether or not the own vehicle has laterally moved from a rearward position to a lateral position relative to the preceding vehicle. Further, based on the relative speed of the own vehicle with respect to the preceding vehicle, the driving assistance ECU 10 determines whether or not the own vehicle is in the passing driving state enabling the own vehicle to pass the preceding vehicle. This allows the presence or absence of passing driving of the own vehicle to be properly determined, thereby providing proper driving assistance.

In addition, if the own vehicle attempts to pass the preceding vehicle in the no-passing zone, the driving assistance ECU 10 can alert the driver of the own vehicle to no passing before actually passing the preceding vehicle.

The driving assistance ECU 10 is configured to, based on occurrence of the turn signal on the opposite hand side to the hand of traffic, determine the presence or absence of the initial action to start laterally moving from a rearward position to a lateral position relative to the preceding vehicle. Such use of a relationship between the direction indicated by the turn signal and the hand of traffic can increase the determination accuracy.

The driving assistance ECU 10 is configured to, if after the own vehicle has laterally moved it is determined that the lateral distance from the own vehicle to the preceding vehicle is within the predetermined range, confirm the presence of the preceding vehicle to be passed. This can properly confirm the presence of the preceding vehicle to be passed, which can lead to more accurate passing determination.

The driving assistance ECU 10 is configured to, if after the lane change of the own vehicle the speed of the own vehicle exceeds that of the preceding vehicle by the predetermined value or more, determine that the own vehicle is thereafter likely to pass the preceding vehicle. Taking into account the relative speed of the own vehicle with respect to the preceding vehicle makes it possible to properly determine that the own vehicle is in the passing driving state.

(Modifications)

There will now be explained some modifications that may be devised without departing from the spirit and scope of the present invention.

(1) The hand of traffic depends on individual countries or regions. Therefore, in different countries or regions, the own vehicle may travel following different hand traffic rules. The driving assistance ECU 10 may be configured to, based on the image data from the imaging unit 21 or map information from the navigation unit 27, determine the hand of traffic, and based on occurrence of the turn signal on the opposite hand side to the hand of traffic, determine whether or not the initial action to start passing has been taken.

(2) In the above embodiment, the driving assistance ECU 10 is configured to, based on the relative speed of the own vehicle with respect to the preceding vehicle after the lane change of the own vehicle, determine whether or not the own vehicle is in the passing driving state. Alternatively, the driving assistance ECU 10 may be configured to, based on a relative position of the own vehicle with respect to the preceding vehicle, determine whether or not the own vehicle is in the passing driving state. In such a configuration, if the own vehicle is positionally approaching the preceding vehicle, it may be determined that the own vehicle is in the passing driving state.

(3) The determination as to the presence or absence of the initial action to start passing may be made based on something other than the turn signal. For example, the determination as to the presence or absence of the initial action to start passing may be made based on a change of steering angle or a change of yaw signal.

What is claimed is:

1. A vehicle driving assistance apparatus that is installed on an own vehicle, the apparatus comprising:
    an initial action determiner configured to determine, using a central processing unit, the presence or absence of an initial action taken by the own vehicle to start laterally moving from a rearward position to a lateral position relative to a preceding vehicle ahead of the own vehicle such that the own vehicle can accelerate from the lateral position to pass the preceding vehicle;
    a lateral movement determiner configured to determine, using the central processing unit, whether or not the own vehicle has laterally moved from the rearward position to the lateral position relative to the preceding vehicle;
    a passing driving state determiner configured to determine, using the central processing unit, whether or not the own vehicle is in a passing driving state enabling the own vehicle to pass the preceding vehicle, in response to the own vehicle moving laterally from the rearward position to the lateral position relative to the preceding vehicle after the initial action has been taken, the passing driving state determiner determining whether or not the own vehicle is in a passing driving state based on a lateral distance between the own vehicle and the preceding vehicle and a relative speed of the own vehicle with respect to the preceding vehicle;
    a passing driving determiner configured to determine, using the central processing unit, that the own vehicle is likely to pass the preceding vehicle, in response to the passing driving state determiner determining that the own vehicle is in the passing driving state;
    a no-passing zone determiner configured to determine, using the central processing unit, whether or not the own vehicle is traveling in a no-passing zone of a road where passing a preceding vehicle while traveling within the no-passing zone of the road is restricted; and
    an alert controller configured to withhold a warning regarding the no-passing zone, via an alert device to a driver of the own vehicle, in response to the no-passing zone determiner determining that the own vehicle is traveling in the no-passing zone, the initial action determiner determining that the initial action has been taken, and the lateral movement determiner determining that the own vehicle has laterally moved from the rearward position to the lateral position relative to the preceding vehicle, the alert controller withholding the warning until the passing driving determiner determines that the own vehicle is in the passing driving state, which enables the own vehicle to pass the preceding vehicle,
    wherein the lateral movement determiner is configured to determine that the own vehicle has laterally moved from the rearward position to the lateral position relative to the preceding vehicle in response to a lateral distance from the own vehicle to the preceding vehicle resulting from lateral movement of the own vehicle is within a predetermined range.

2. The apparatus of claim 1, wherein the initial action determiner is configured to, upon occurrence of a turn signal on an opposite hand side to a hand of traffic, determine that the initial action has been taken to start laterally moving from the rearward position to the lateral position relative to the preceding vehicle.

3. The apparatus of claim 1, wherein the passing driving state determiner is configured to, if a speed of the own vehicle exceeds that of the preceding vehicle by a predetermined value or more, determine that the own vehicle is in the passing driving state.

4. The apparatus of claim 1, wherein the passing driving determiner is configured to set a passing flag ON to indicate that the own vehicle is in the passing driving state in response to the passing driving state determiner determining that the own vehicle is in the passing driving state.

5. The apparatus of claim 1, wherein the lateral movement determiner is configured to set a lane change flag ON in response to determining that the own vehicle has laterally moved from the rearward position to the lateral position relative to the preceding vehicle.

6. The apparatus of claim 1, wherein the no-passing zone determiner is configured to determine whether or not the own vehicle is traveling in a no-passing zone based on image data of a traffic sign indicative of the no-passing zone that is captured by an imaging unit.

7. The apparatus of claim 1, wherein the no-passing zone determiner is configured to determine whether or not the own vehicle is traveling in a no-passing zone based on no-passing zone information included in navigation information.

8. A vehicle driving assistance method comprising:
a step of, in the presence of a preceding vehicle traveling ahead of an own vehicle, determining the presence or absence of an initial action taken to start laterally moving from a rearward position to a lateral position relative to the preceding vehicle such that the own vehicle can accelerate from the lateral position to pass the preceding vehicle;
a step of determining whether or not the own vehicle has laterally moved from the rearward position to the lateral position relative to the preceding vehicle;
a step of determining whether or not the own vehicle is in a passing driving state enabling the own vehicle to pass the preceding vehicle, in response to determining that the own vehicle has laterally moved from the rearward position to the lateral position relative to the preceding vehicle after the initial action has been taken, based on a lateral distance between the own vehicle and the preceding vehicle and a relative speed of the own vehicle with respect to the preceding vehicle; and
a step of determining that the own vehicle is likely to pass the preceding vehicle, in response to determining that the own vehicle is in the passing driving state;
a step of determining whether or not the own vehicle is traveling in a no-passing zone of a road where passing a preceding vehicle while traveling in the no-passing zone of the road is restricted; and
a step of, withholding a warning regarding the no-passing zone, via an alert to a driver of the own vehicle, even if it is determined in response to determining that the own vehicle is traveling in the no-passing zone, determining that the initial action has been taken, and determining the own vehicle has laterally moved from the rearward position to the lateral position relative to the preceding vehicle, the warning regarding the no-passing zone being withheld until it is determined that the own vehicle is likely to pass the preceding vehicle in the passing driving state, which enables the own vehicle to pass the preceding vehicle,
wherein the step of determining whether or not the own vehicle has laterally moved includes, determining that the own vehicle has laterally moved from the rearward position to the lateral position relative to the preceding vehicle in response to a lateral distance from the own vehicle to the preceding vehicle resulting from lateral movement of the own vehicle being within a predetermined range.

9. A vehicle driving assistance apparatus that is installed on an own vehicle, the apparatus comprising:
an initial action determiner configured to determine, using a central processing unit the presence or absence of an initial action taken by the own vehicle to start laterally moving from a rearward position to a lateral position relative to a preceding vehicle ahead of the own vehicle such that the own vehicle can accelerate from the lateral position to pass the preceding vehicle;
a passing driving determiner configured to determine, using the central processing unit, whether or not the own vehicle is likely to pass the preceding vehicle, based on a lateral distance between the own vehicle and the preceding vehicle and a relative speed of the own vehicle with respect to the preceding vehicle;
a no-passing zone determiner configured to determine, using the central processing unit, whether or not the own vehicle is traveling in a no-passing zone; and
an alert controller configured to withhold a warning regarding the no-passing zone, via an alert to a driver of the own vehicle, in response to the no-passing zone determiner determining that the own vehicle is traveling in the no-passing zone and the initial action determiner determining that the initial action has been taken, the alert controller withholding the warning until the passing driving determiner determines that the own vehicle is likely to pass the preceding vehicle.

* * * * *

UNITED STATES PATENT AND TRADEMARK OFFICE
CERTIFICATE OF CORRECTION

PATENT NO. : 10,406,977 B2
APPLICATION NO. : 15/166833
DATED : September 10, 2019
INVENTOR(S) : Naoto Yoshitomi et al.

Page 1 of 1

It is certified that error appears in the above-identified patent and that said Letters Patent is hereby corrected as shown below:

In the Claims

In Column 10, Line 3, Claim 8, change "a step of, withholding" to --a step of withholding--.

In Column 10, Lines 4-5, Claim 8, after "vehicle," delete "even if it is determined".

Signed and Sealed this
Fourteenth Day of January, 2020

Andrei Iancu
*Director of the United States Patent and Trademark Office*